United States Patent
Moon (10) Patent No.: US 8,300,205 B2
(45) Date of Patent: Oct. 30, 2012

(54) APPARATUS AND METHOD FOR WASHING ALIGNMENT FILM PRINTING MASK AND METHOD FOR FABRICATING A LIQUID CRYSTAL DISPLAY DEVICE

(75) Inventor: Cheol Joo Moon, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 351 days.

(21) Appl. No.: 12/778,171

(22) Filed: May 12, 2010

(65) Prior Publication Data

US 2010/0212826 A1 Aug. 26, 2010

Related U.S. Application Data (62) Division of application No. 11/321,082, filed on Dec. 30, 2005, now Pat. No. 7,787,099.

(30) Foreign Application Priority Data

Jun. 20, 2005 (KR) ........................ 10-2005-0053119

(51) Int. Cl.
*G02F 1/13* (2006.01)
*G02F 1/1337* (2006.01)
(52) U.S. Cl. .......... 349/187; 349/123; 349/124; 355/53; 356/401; 430/5; 378/34
(58) Field of Classification Search .................. 349/187; 430/5; 355/53; 378/34; 356/401
See application file for complete search history.

(56) References Cited

U.S. PATENT DOCUMENTS

| | | | |
|---|---|---|---|
| 3,762,951 A | 10/1973 | Hetznecker | |
| 4,801,376 A | 1/1989 | Kilitz | |
| 5,671,544 A | 9/1997 | Yokomizo et al. | |
| 5,800,949 A | 9/1998 | Edo | |
| 5,840,261 A | 11/1998 | Monch | |
| 5,908,042 A | 6/1999 | Fukunaga et al. | |
| 5,940,985 A | 8/1999 | Kamikawa et al. | |
| 6,027,574 A | 2/2000 | Fishkin et al. | |
| 6,734,936 B1 | 5/2004 | Schadt et al. | |
| 2001/0023700 A1 | 9/2001 | Drayer et al. | |
| 2003/0180807 A1* | 9/2003 | Hess et al. | 435/7.1 |
| 2004/0001177 A1 | 1/2004 | Byun et al. | |
| 2005/0034810 A1* | 2/2005 | Yamazaki et al. | 156/345.3 |
| 2005/0263170 A1 | 12/2005 | Tannous et al. | |
| 2006/0005857 A1 | 1/2006 | Liang et al. | |
| 2008/0248589 A1* | 10/2008 | Belisle et al. | 436/518 |

FOREIGN PATENT DOCUMENTS

KR 1996-016100 11/1996

* cited by examiner

*Primary Examiner* — Huyen Ngo
(74) *Attorney, Agent, or Firm* — McKenna Long & Aldridge LLP (57) ABSTRACT

The present invention relates to an alignment film printing mask, and more particularly, to a jig for an alignment film printing mask. A jig according to the present invention includes a plurality of supporting members each having at least one bent portion, arranged at regular intervals along a width direction of the alignment film printing mask for supporting the alignment film printing mask, at least one connection member for connecting the supporting members, and fastening units for securing the alignment film printing mask supported by the supporting members.

17 Claims, 6 Drawing Sheets

APPARATUS AND METHOD FOR WASHING ALIGNMENT FILM PRINTING MASK AND METHOD FOR FABRICATING A LIQUID CRYSTAL DISPLAY DEVICE

This application is a divisional of prior U.S. patent application Ser. No. 11/321,082 filed Dec. 30, 2005 now U.S. Pat. No. 7,787,099 which application claims the benefit of Korean Patent Application No. 2005-53119, filed on Jun. 20, 2005, which are hereby incorporated by reference for all purposes as if fully set forth herein.

BACKGROUND OF THE INVENTION

1. Field of the Invention

The present invention relates to an apparatus for washing an alignment film printing mask and a method for fabricating a display device using the same, and more particularly, to a jig for washing an alignment film printing mask.

2. Discussion of the Related Art

Owing to advantages of low voltage driving, full color reproduction, light/thin/short/small configuration, a low power consumption, and so on, liquid crystal display devices have become widely applied to electronic devices ranging from watches, calculators, notebook computers, to PDAs, TVs, cellular phones, monitors for air planes, monitors for PCs, and so on.

In order to use the liquid crystal display devices, it is required to orient liquid crystal molecules in a particular direction. To do so, an organic polymer film called as an alignment film is formed on an ITO electrode. The alignment film is formed by coating a liquid raw material of the alignment film, for example, polyamic acid, soluble polyimide, or the like, on a substrate, polyimidizing (or curing) the liquid raw material, and rubbing the cured polyimide. That is, the liquid raw material of the alignment film is printed on a upper surface of the substrate with an alignment film printing apparatus, and the liquid raw material of the alignment film is heated to a temperature in a range of 60° C.~80° C. to primarily cure the liquid raw material, and is then heated to a temperature in a range of 80° C.~200° C. to secondarily cure the liquid raw material. Thereafter, the alignment film is formed by rubbing the surface of the raw material of the alignment film or by directing a beam of light onto it.

The alignment film is generally printed on either the substrate having a TFT pattern formed thereon or the substrate having a color filter pattern formed thereon using three rolls of a doctor roll, an anilox roll and a printing roll, and an alignment film printing mask (hereinafter referred to as "mask"). The mask is generally constructed of a rubber plate (APR rubber plate) having a predetermined pattern with openings. When the mask is repeatedly used, polyimide (PI) used during the formation of the alignment film gradually accumulates at the openings. Therefore, it is required to wash the mask at appropriate intervals to remove the remains of polyimide from the openings. A mask washing apparatus is separately used to do so.

The mask washing apparatus is provided with a washing tank filled with N-Methyl Pyrrolidone (NMP) liquid and a jig for holding the mask. The height of the washing tank is generally greater than the height of the mask. The mask held by the jig is introduced into the washing tank.

Recently, as the size of the liquid crystal display devices has become larger, the size of the mask has become larger. Thus, the size of the jig and the height of the washing tank are required to become larger to wash the large-size mask. Due to this trend, the consumption of NMP for washing the mask is sharply increased, which increases the fabrication cost.

In addition, because the recent mask has a height in a range of 2000 3000 mm, a height of a clean room storing the production equipment is required to be in a range of 5000~6000 mm to introduce the mask into the washing tank. As a result, a separate clean room space is required to install the mask washing apparatus, which further increases the fabrication cost.

Moreover, because the jig holding the mask is taken out of the washing tank after a predetermined time period in a series of washing steps, the washing process is not effective. Also, the remains of NMP on the mask impair the printing performance of the alignment film mask.

SUMMARY OF THE INVENTION

Accordingly, the present invention is directed to a jig for washing an alignment film printing mask and a method for fabricating a display device that substantially obviate one or more problems due to limitations and disadvantages of the related art.

An advantage of the present invention is to provide a jig for washing an alignment film printing mask that can minimize space for washing the printing mask and improve the washing performance, and a method for fabricating a display device using the same.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a method for fabricating a liquid crystal display includes providing a first substrate and a second substrate; forming an alignment layer on one of the first and second substrates using a mask; cleaning the mask using a jig, wherein the jig includes: a plurality of supporting members each having at least one bent portion, arranged at regular intervals along a width direction of the mask for supporting the mask; at least one connection member for connecting the supporting members; and fastening unit for securing the mask supported by the supporting members; providing liquid crystal on the alignment layer; and bonding the first and second substrates to each other.

In another aspect of the present invention, an apparatus for washing a mask includes a jig for mounting a mask folded at least once; a washing unit filled with a washing solution for washing the mask; and a drying unit supplied with a drying gas for drying the mask.

In yet another aspect of the present invention, a method for washing an alignment film printing mask includes mounting an alignment film printing mask on a jig; dipping the jig in NMP held in a first washing unit after washing PI on the alignment film printing mask; dipping the jig in IPA held in a second washing unit to wash NMP formed on the alignment film printing mask at the time the PI is washed off in the first washing unit; drying the alignment film printing mask washed in the second washing unit; and taking out the jig after said drying.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1:
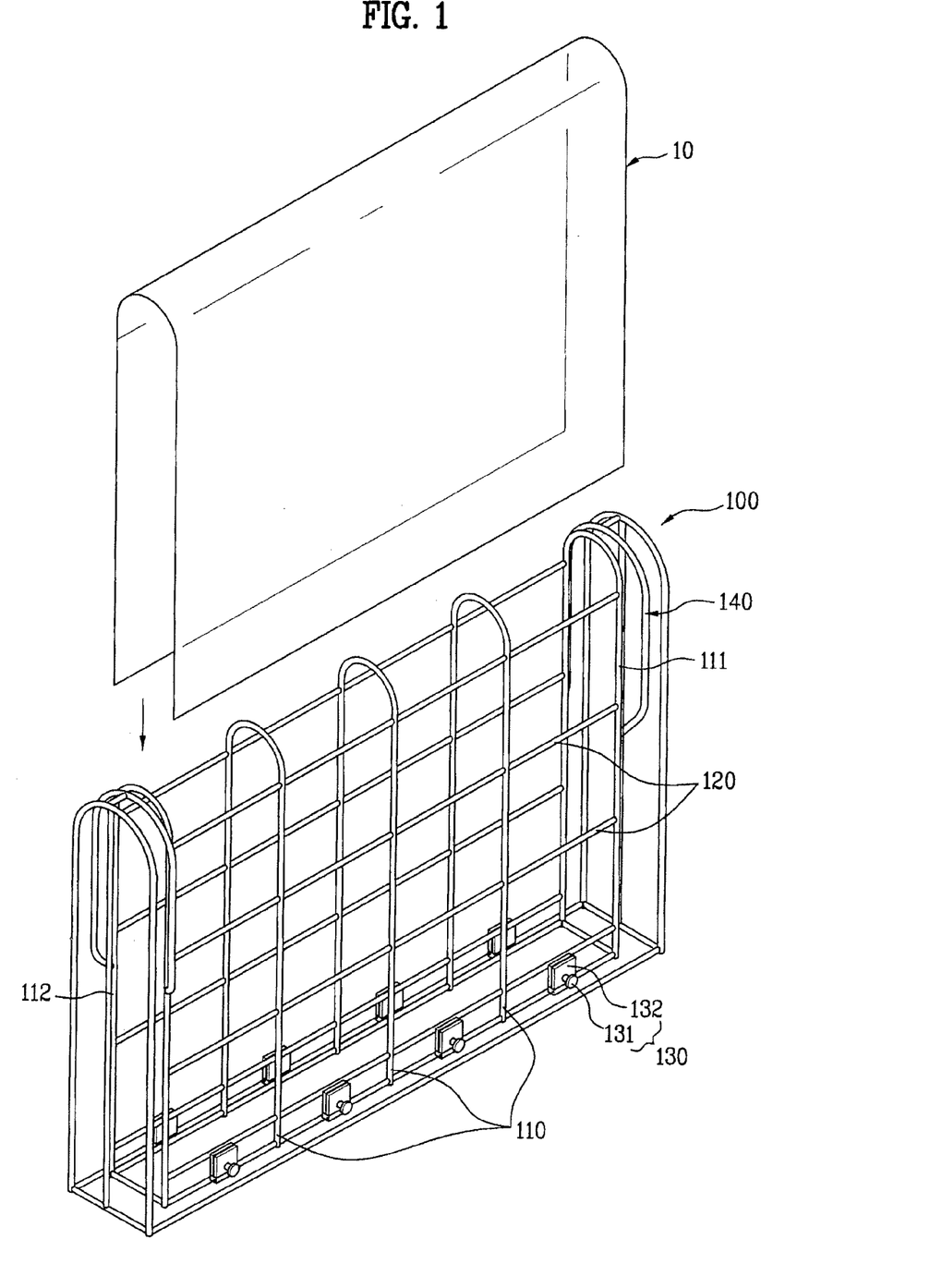
FIG. 1 illustrates a perspective view of a jig for an alignment film printing mask according to an embodiment of the present invention.
Figure 2:
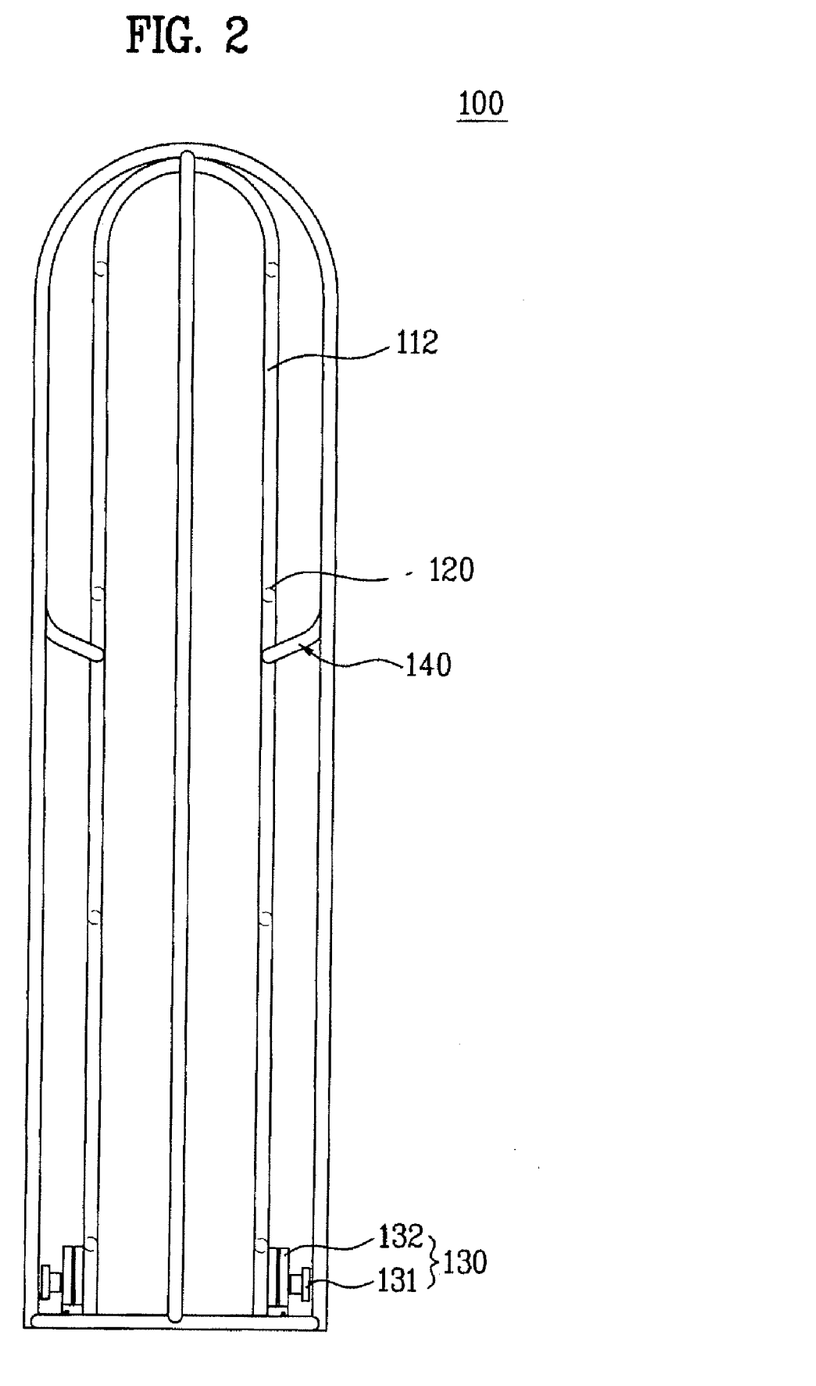
FIG. 2 illustrates a side view of the jig illustrated in FIG. 1.

FIG. 1 illustrates a perspective view of a jig for an alignment film printing mask according to an embodiment of the present invention and FIG. 2 illustrates a side view of the jig illustrated in FIG. 1.

Referring to FIGS. 1 and 2, the jig 100 includes a plurality of supporting members 110, at least one connection member and fastening units. The supporting members 110 support one side (non-active side) of an alignment film printing mask (hereafter referred to as "mask"). Each of the supporting members 110 is bent in a 'U' shape, with two ends facing downward with respect to a center portion, and the supporting members 110 are mounted at regular intervals along a width direction of the mask 10.

The supporting members 110 are constructed of a hollow circular pipe in this embodiment. However, the supporting members 110 may be constructed of any one of a circular pin, a polygonal bar and a hollow polygonal pipe. The center portions of the supporting members 110 are curved to prevent the mask 10 from crumpling and to be in a close contact with the mask 10. The supporting members 110 are arranged at intervals in which no crumpling of the mask 10 occurs and a washing area of the mask 10 can be maximized. The supporting members 110 are also positioned to support portions of the mask 10 that do not have any pattern formed thereon.

The jig 100 further includes at least one connection member 120 which is connected to the supporting members 110. As illustrated in the drawings, the connection member 120 is mounted perpendicular to the supporting members 110, and crossing portions between the supporting members 110 and the connection member 120 are not projected toward a side where the mask 10 is positioned to prevent the mask 10 from forming a gap with the jig 100. That is, the connection member 120 crosses an inside surface of the supporting members 110.

Fastening units 130 secure the mask 10 supported by the supporting members 110 and are mounted at a bottom portion of the jig 100. The fastening units 130 include clamps that contact and hold the mask 10 to prevent the mask 10 suffering from damage and to securely fasten the mask 10. Each of the fastening units 130 includes a bolt 131, and a jaw 132 for contacting and holding the mask 10, as the bolt 131 is fastened. Other fastening mechanisms, such as a general clamp in which an elastic force of a spring is used, can be adapted to secure the mask 10.

The jig 100 is configured such that it can be automatically conveyed by a conveyance device, such as a robot arm, or it can be handled by an operator if required. Accordingly, there are additional handling portions 140 on the two supporting members 111 and 112 at the outermost sides of the jig 100. The handling portions 140 are connected to the two supporting members 111 and 112, and each has the same shape as the supporting members 110, but the width and height of the handling portions 140 are greater than the supporting members 110. The handling portions 140 serve not only as a hand grip for carrying the jig 100, but also as a guide for accurately placing the mask 10 on the supporting members 110.

A series of steps for placing the mask 10 on the jig 100 will now be described. A center of the folded mask 10 is positioned at the centers of the supporting members 110, and the two sides of the mask 10 are in close contact with the two sides of each supporting member 110. Thus, the center of the folded mask 10 is in close contact with an outside surface of the centers of the supporting members 110, and the two sides of the folded mask 10 are in close contact with outside surfaces of the two sides of each supporting member 110. Placing the mask 10 on the jig 100 is completed by fastening the two ends of the mask 10 to the fastening units 130.

Although the two ends of the mask 10 are fastened by the fastening units 130, the mask 10 can move in a width direction. Therefore, an additional structure is beneficially provided to prevent the mask 10 from falling off the jig 100 in an outer side direction of the jig 100.

Figure 3:
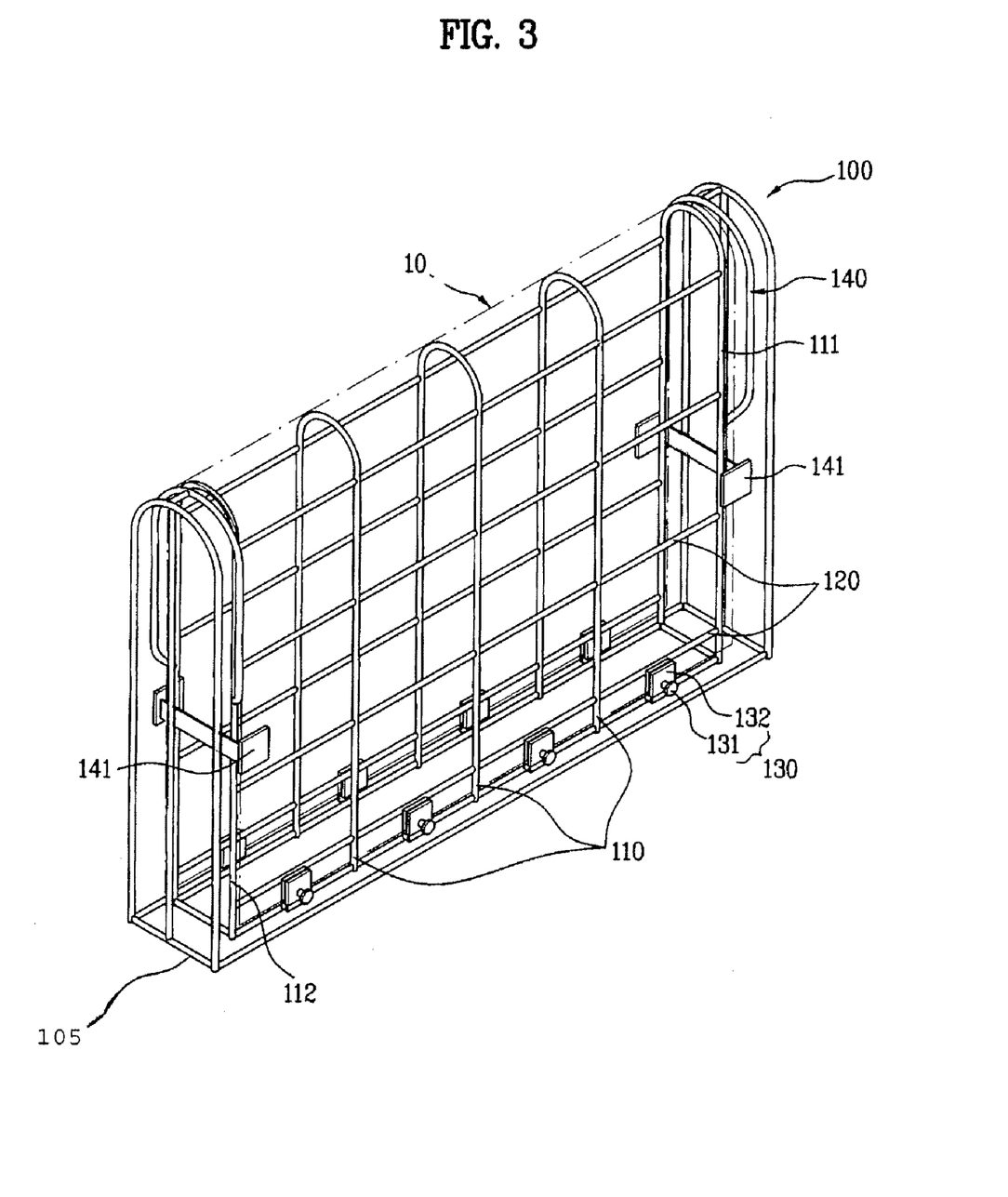
FIG. 3 illustrates a perspective view of a jig for an alignment film printing mask according to another embodiment of the present invention.
Figure 4:
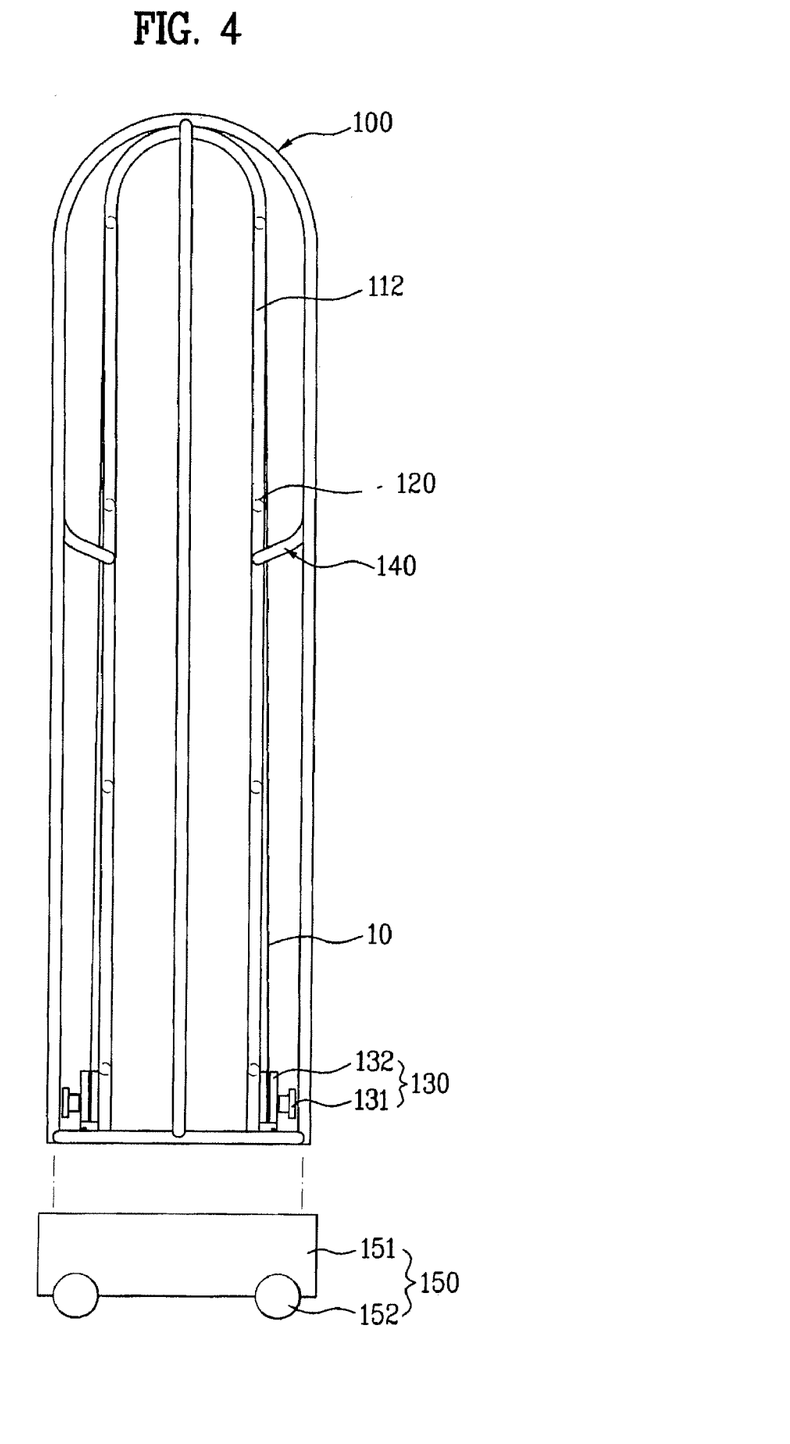
FIG. 4 illustrates a side view of a jig for an alignment film printing mask and a transfer unit according to another embodiment of the present invention.

Referring to FIG. 3, a jig 100 according to the present invention includes preventing units 141 at the outermost supporting members 111 and 112 to prevent the mask 10 from falling off the jig 100 in an outer side direction. The two ends of each preventing unit 141 connect the two sides of the outermost supporting member 111 or 112. Each preventing unit 141 may include a clamp identical to the fastening portion 130 to secure the two sides of the mask 10. An outer frame 105 supports the supporting members 110, outermost supporting members 111 or 112, and connection member 120.

Figure 5:
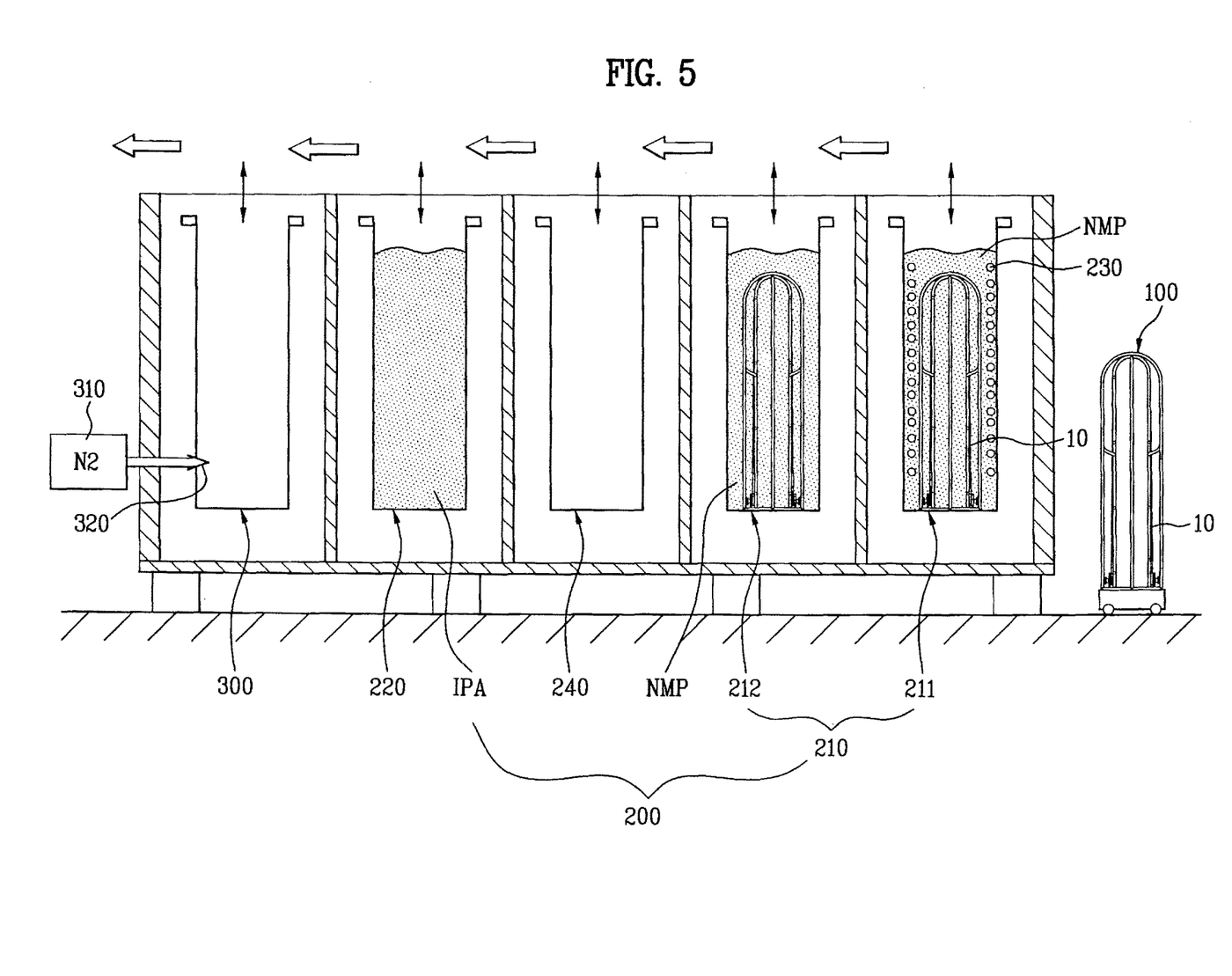
FIG. 5 illustrates a method for washing an alignment film printing mask using a jig according to the present invention.

Referring to FIG. 5, a transfer unit 150 on a underside (more specifically, opposite undersides of the supporting members) may be used to easily carry the jig 100 toward a washing apparatus. Accordingly, the transfer unit 150 includes a body 151 having a upper surface contacting the two ends of each supporting member 110, and rollers 152 on a underside of the body 151. Particularly, each supporting member 110 is detachable from the transfer unit 150. That is, when the mask 10 is introduced into a washing apparatus, the transfer unit 150 is detached so that only the mask 10 mounted on the jig 100 is introduced into the washing apparatus. The jig 100 may be conveyed to the washing apparatus by a robot arm.

FIG. 5 illustrates a method for washing an alignment film printing mask using a jig according to the present invention.

Referring to FIG. 5, the washing apparatus includes a jig 100, a washing unit 200 and a drying unit 300. As described above, the jig 100 is configured such that a mask 10 folded in half are mounted thereon.

The washing unit 200 filled with a washing solution has enough space to fully submerge the jig 100 to clean the mask 10. The washing unit 200 includes at least one PI (polyimide) washers 210 and at least one NMP washer 220. There are two PI washers 210, and a space between the two PI washers 211 and 212 is partitioned. Each of the two PI washers 211 and 212 holds NMP (N-Methyl Pyrrolidone) for washing PI remains on the mask 10.

The first PI washer 211 into which the jig 100 is first introduced (hereafter referred to as "primary PI washer") includes a bubble generating portion 230 for generating bubbles and providing the bubbles to NMP held therein. The bubbles cause NMP to circulate so that an entire portion of the mask 10 can be uniformly washed. Although not shown, the bubble generating portion 230 generates bubbles by injecting a gas. The second PI washer 212 (hereafter referred to as "secondary PI washer") receives the mask 10 washed at the primary PI washer 211 and washes the mask 10 again.

An NMP washer 220 holding IPA (Iso Propyl Alcohol) therein receives the mask 10 washed in succession at the two PI washers 211 and 212 and washes off the NMP remains on the mask 10 with IPA. The washing unit 200 may further include a separate DI holding tank 240 holding deionized water.

The drying unit 300 dries the washed mask 10 and has enough space to fully hold the jig 100. A drying gas is supplied to the drying unit 300 to dry the mask 10. There is a nozzle 320 connected to the drying unit 300 to supply the drying gas from a gas storage unit 310. The gas is generally $N_2$ gas. The washing apparatus may have the washing unit 200 and the drying unit 300 separate from each other, or may be formed as a single unit as illustrated in FIG. 5.

Figure 6:
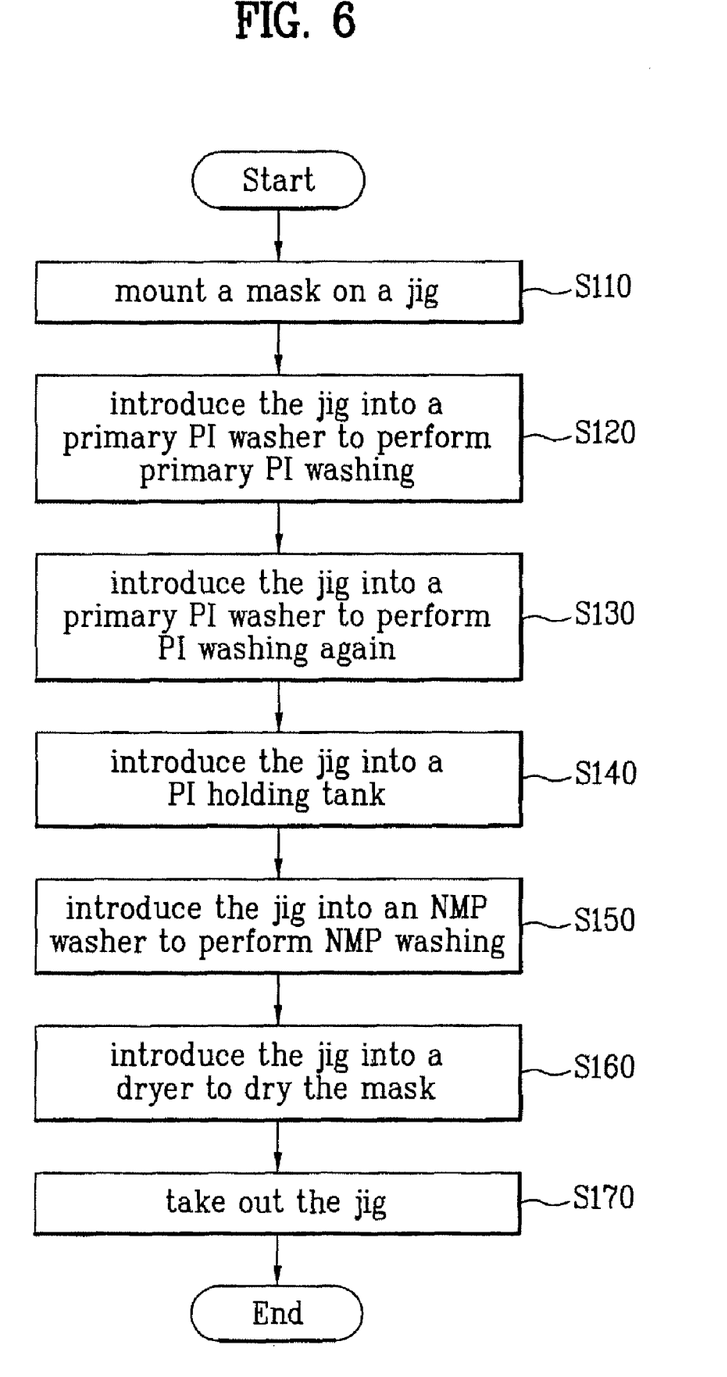
FIG. 6 illustrates a flow chart illustrating the steps of a method for washing an alignment film printing mask using an alignment film printing mask according to the present invention.

A series of steps for washing and drying the mask 10 will now be described with reference to FIG. 6.

First, the mask 10 is mounted on the jig 100 (S110). The jig 100 with the mask 10 mounted thereon is then conveyed to the primary PI washer 211. The jig 100 may be conveyed by the transfer unit 150. The jig 100 conveyed to the primary PI washer 211 is then separated from the transfer unit 150, and is introduced into the primary PI washer 211 (S120). NMP held in the primary PI washer 211 washes PI off a surface and openings (not shown) of the mask 10 mounted on the jig 100. As described above, bubbles generated from the generating portion 230 flow in the primary PI washer 211 to uniformly deliver NMP to various portions of the mask 10.

The mask 10 finished at the primary PI washer 211 is taken out of the primary PI washer 211 and introduced into the secondary PI washer 212, together with the jig 100 (S130). The PI remains on the mask 10 is washed again by NMP held in the secondary PI washer 212. NMP in the secondary PI washer 212 is cleaner than NMP in the primary PI washer 211. Therefore, as the mask 10 passes successively through the primary PI washer 211 and the secondary PI washer 212, the PI remains at the surface and openings of the mask 10 is completely removed.

The mask 10 finished at the secondary PI washer 212 is then taken out of the secondary PI washer 212 and introduced into the NMP washer 220, together with the jig 100 (S150). The mask 10 may be briefly introduced into a separate DI holding tank 240 holding deionized water therein (S140) before the mask 10 is introduced into the NMP washer 220. IPA held in the NMP washer 220 washes NMP remains introduced by the NMP washer 220 off the mask 10.

Then, the mask 10 finished at the NMP washer 220 is taken out of the NMP washer 220 and introduced into the drying unit 300, together with the jig 100 (S160). The nozzle 320 connected to the drying unit 300 provides $N_2$ gas from the gas storage unit 310 to the drying unit 300 to dry the mask 10. Although the mask 10 is mounted on the jig 100, $N_2$ gas is uniformly provided to both sides (an active side, and a non-active side) of the mask 10 because sides of the jig 100 are open. After drying the mask 10, the jig 100 is then taken out of the drying unit 300 (S170) and discharged from the washing apparatus, thereby completing the washing process of the mask 10.

The jig 100 of the present invention is not limited to the structures described in the foregoing embodiments. Each of the supporting members 110 of the jig 100 may have at least two bent portions to decrease the height of the washing apparatus 200 (or the jig 100). That is, because the mask 10 has a height in a range of 2000 mm 3000 mm, the center portion of the mask 10 is folded once in the earlier description. However, when the mask 10 has a size greater than 3000 mm, the mask 10 may be folded at least two times. In such a case, bending is made in a direction opposite each other. In addition, a bent portion of each supporting member 110 may further include an additional structure to precisely place the mask 10 close to the bent portion.

The forgoing embodiments of the present invention disclose a circular bent portion of each the supporting members 110. However, although not shown, the bent portion may be polygonal. Also, the bent portion may be curved such that the bent portion is in contact with the mask 10.

The forgoing embodiments of the present invention disclose that the two sides of each supporting member 110 are parallel to each other. However, the two sides of each supporting member 110 may be formed to come closer or to move away from each other as it goes toward a bottom portion thereof.

As described above, a jig according to the present invention can hold an alignment film printing mask that is folded at least once, thereby minimizing space and the consumption of NMP or IPA required for washing the mask.

Moreover, a jig according to the present invention increases the washing efficiency because the transfer unit detachable from the supporting members is used to convey the mask to a washing apparatus, and because only the jig excluding the transfer unit is introduced into the washing apparatus.

An apparatus and method for washing an alignment film printing mask according to the present invention removes polyimide remains on the mask more completely and dries the mask more uniformly.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for fabricating a liquid crystal display, the method comprising:
   providing a first substrate and a second substrate;
   forming an alignment layer on at least one of the first and second substrates using a mask;

cleaning the mask using a jig, wherein the jig includes:
    a plurality of supporting members each having at least one bent portion, arranged at regular intervals along a width direction of the mask for supporting the mask;
    at least one connection member for connecting the supporting members; and
    fastening units for securing the mask supported by the supporting members;
providing liquid crystal on the alignment layer; and
bonding the first and second substrates to each other.

2. The method as claimed in claim 1, wherein each of the supporting members has two ends facing downward with respect to a center portion.

3. The method as claimed in claim 1, wherein each of the supporting members has at least two bent portions in a direction opposite to each other.

4. The method as claimed in claim 3, wherein the transfer unit includes:
    a body having a upper surface for coupling to the jig, and rollers on a underside of the body for moving the jig.

5. The method as claimed in claim 1, wherein each of the supporting members is constructed of one of a circular pin, a polygonal bar, a hollow circular pipe and a hollow polygonal pipe.

6. The method as claimed in claim 5, wherein the jig is detachable from the body.

7. The method as claimed in claim 1, wherein the bent portion of the supporting member is curved.

8. The method as claimed in claim 1, wherein the interval between the supporting members is set so that no crumpling of the mask occurs, and smooth washing of the mask can be achieved.

9. The method as claimed in claim 8, wherein the supporting members are arranged to support portions of the mask where no patterns are formed thereon.

10. The method as claimed in claim 1, wherein portions of the supporting members crossing the connection member have no projection toward a side the mask is to be positioned.

11. The method as claimed in claim 1, wherein the fastening units are mounted to the supporting members.

12. The method as claimed in claim 11, wherein the fastening unit is a clamp for making a surface to surface contact with, and fastening the mask.

13. The method as claimed in claim 1, further comprising preventing units at the outermost two supporting members for preventing the mask supported by the supporting members from falling off toward an outer side direction.

14. The method as claimed in claim 1, wherein the preventing unit has two ends connected to the outermost supporting member.

15. The method as claimed in claim 1, further comprising a transfer unit on the jig.

16. The method as claimed in claim 1, wherein the mask is a mask for forming an alignment film.

17. A method for washing an alignment film printing mask, the method comprising:
    mounting an alignment film printing mask on a jig;
    dipping the jig in N-Methyl Pyrrolidone held in a first washing unit after washing polyimide on the alignment film printing mask;
    dipping the jig in Iso Propyl Alcohol held in a second washing unit to wash N-Methyl Pyrrolidone formed on the alignment film printing mask at the time the polyimide is washed off in the first washing unit;
    drying the alignment film printing mask washed in the second washing unit; and
    taking out the jig after said drying.

\* \* \* \* \*